April 18, 1939. R. C. VOKES 2,154,590
BUILDING STRUCTURE
Filed Aug. 24, 1936 9 Sheets-Sheet 1
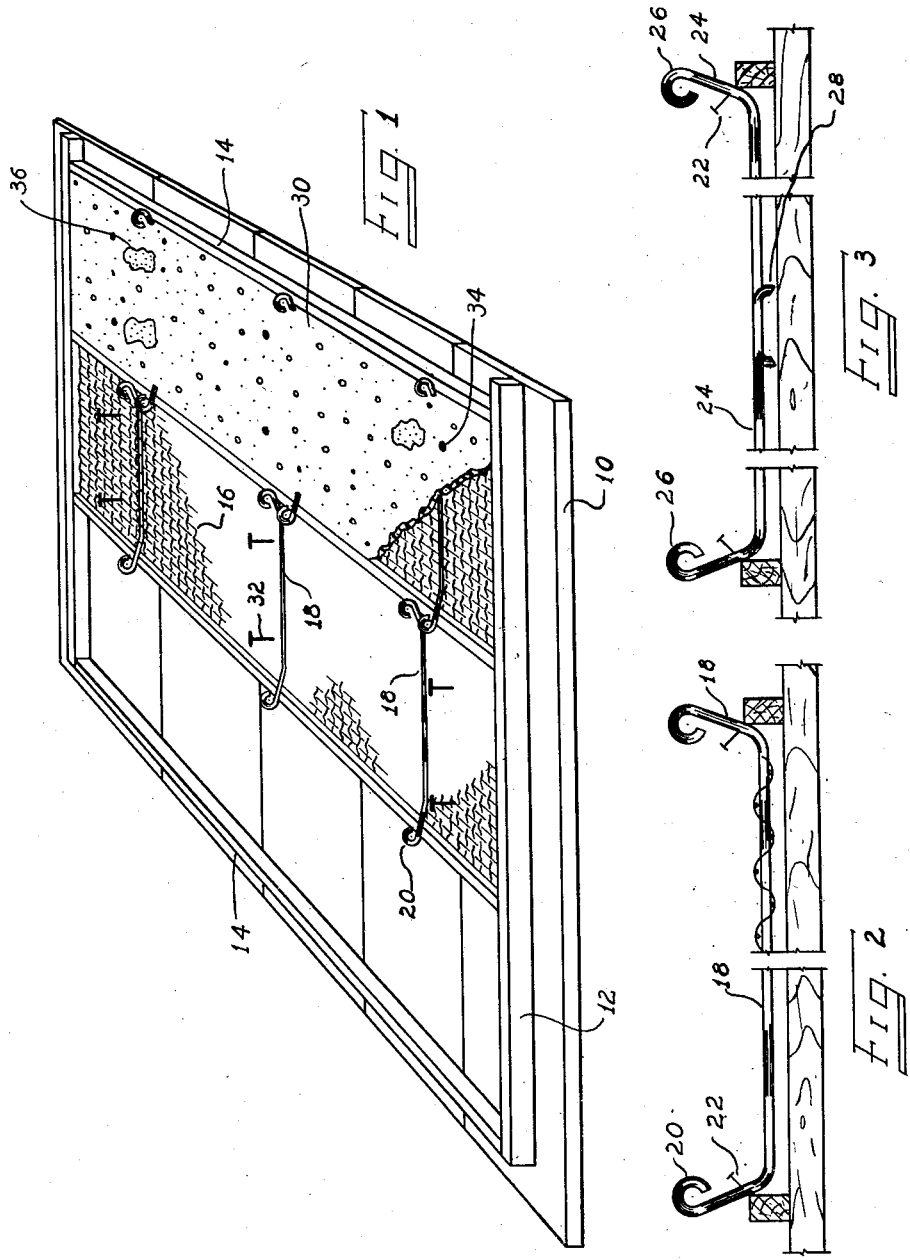
INVENTOR
Ralph C. Vokes
BY Parker & Burton
ATTORNEYS

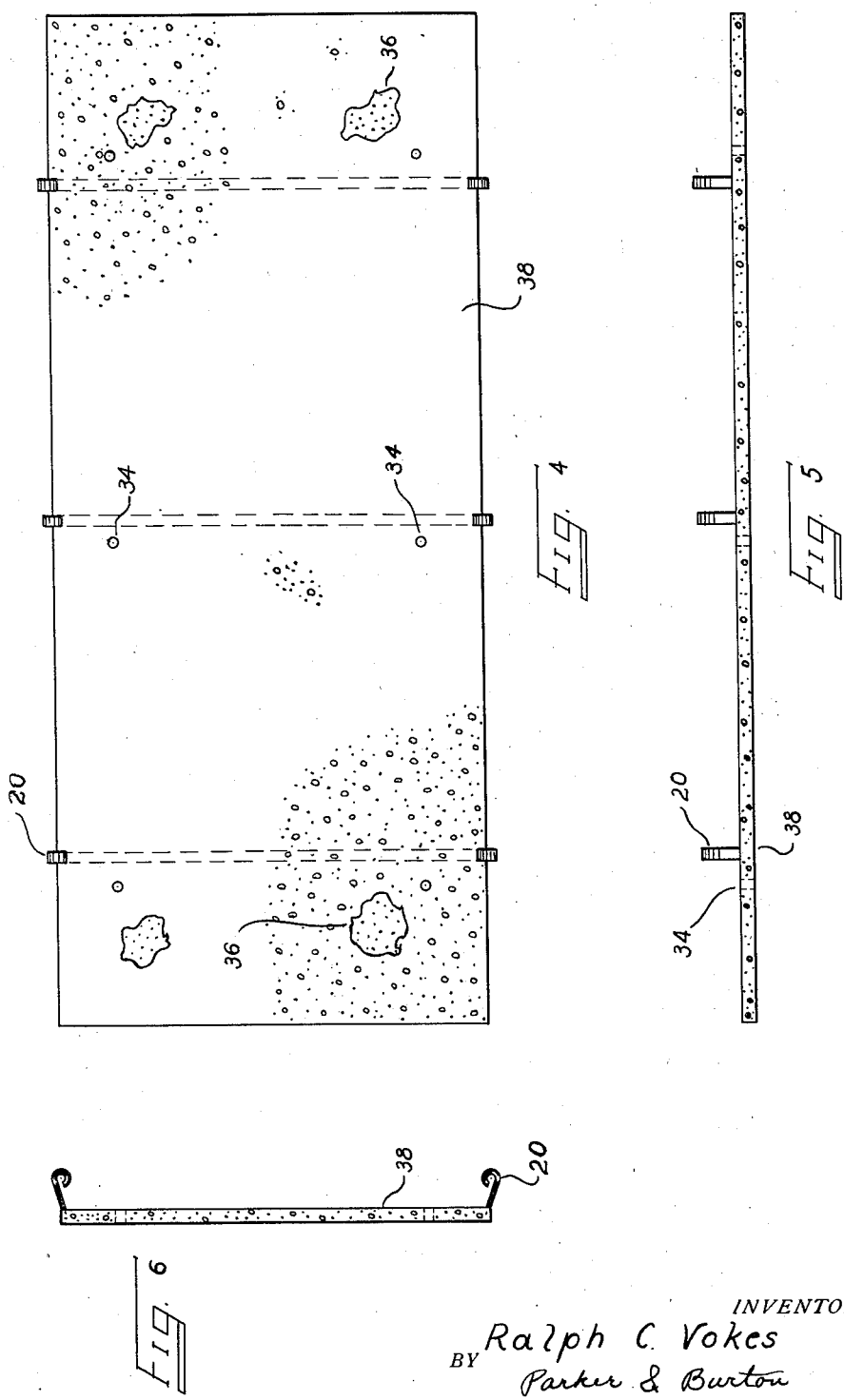

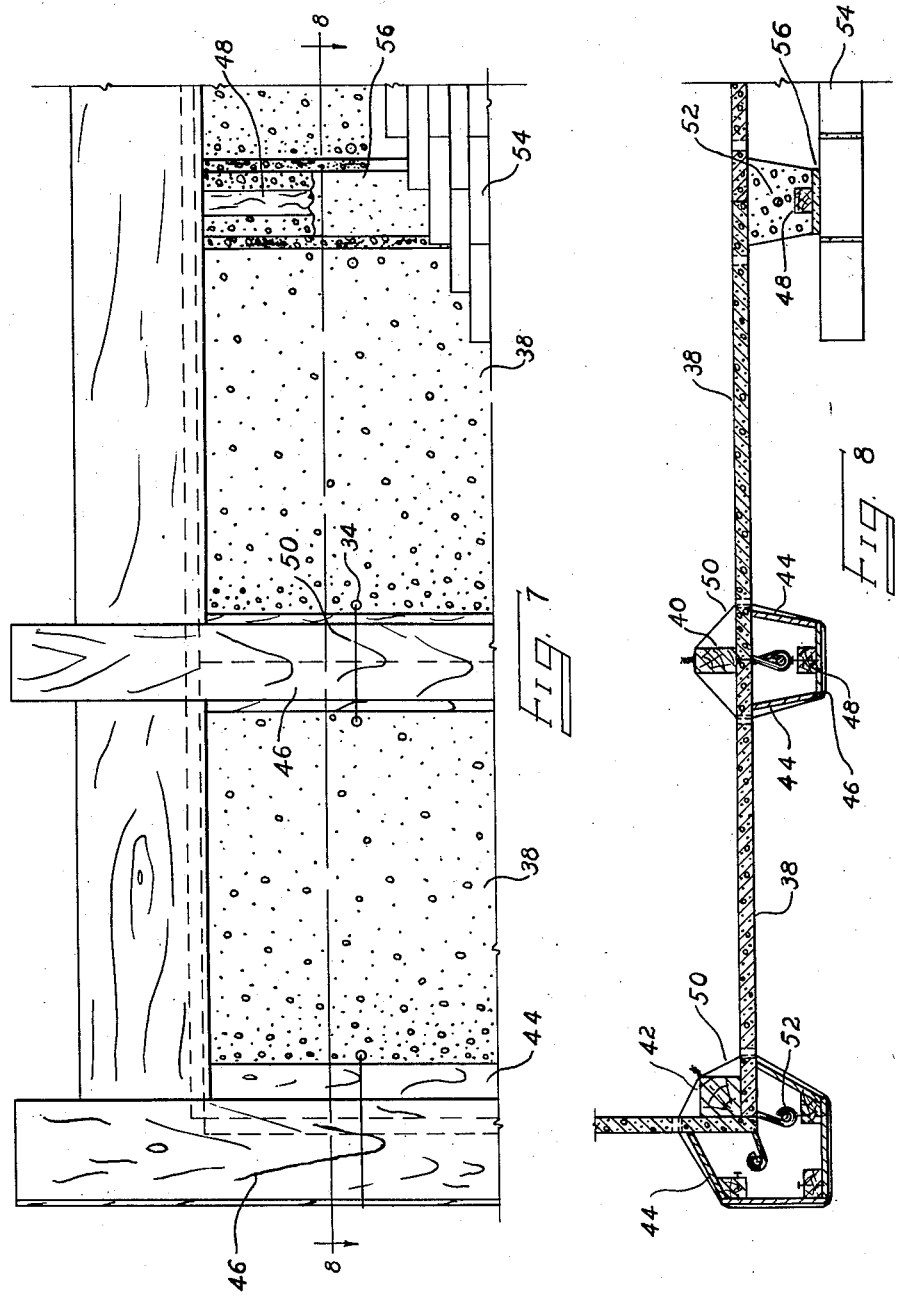

April 18, 1939.   R. C. VOKES   2,154,590
BUILDING STRUCTURE
Filed Aug. 24, 1936   9 Sheets-Sheet 4
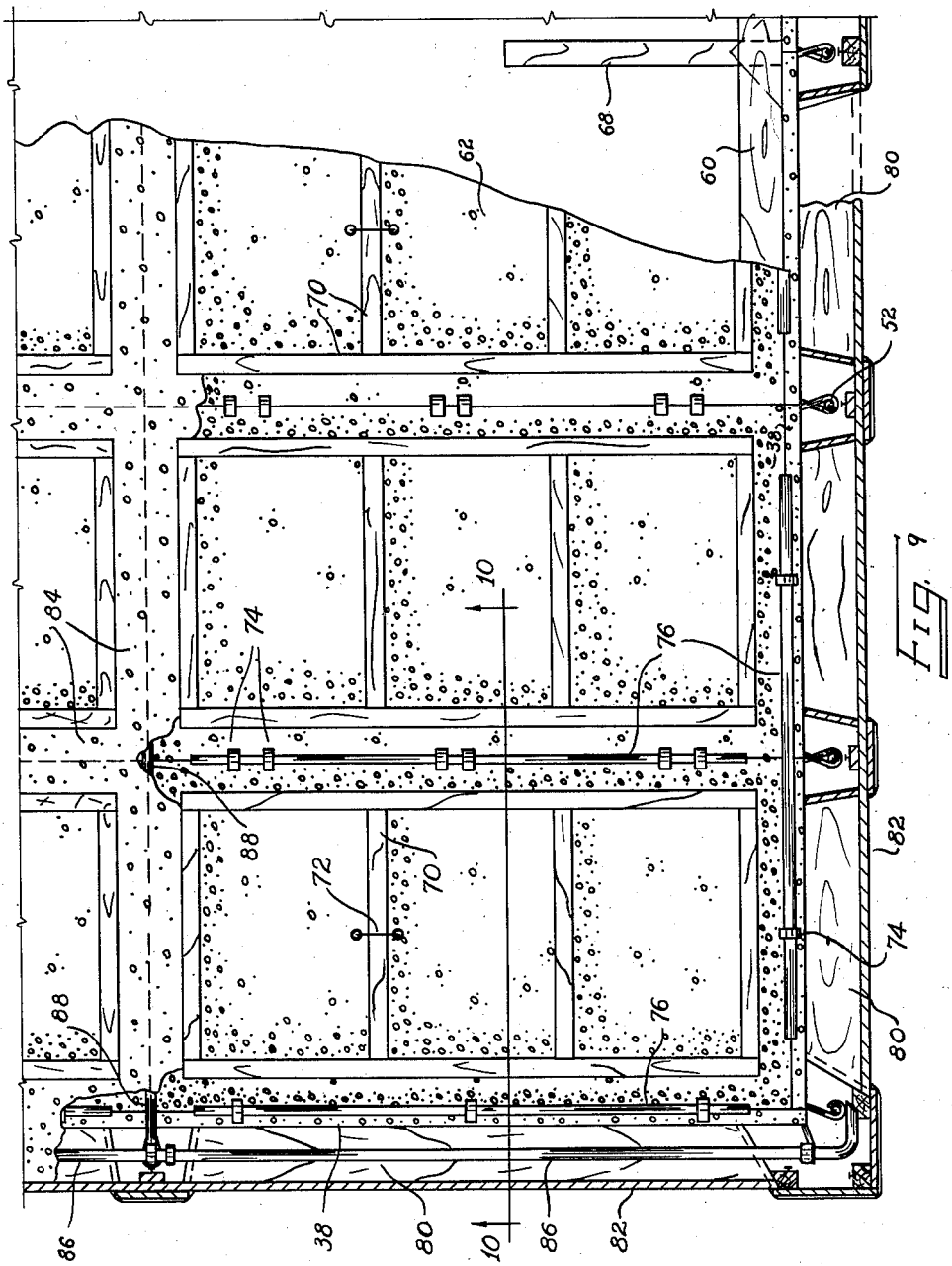
INVENTOR.
Ralph C. Vokes
BY Parker & Barton
ATTORNEYS April 18, 1939.  R. C. VOKES  2,154,590
BUILDING STRUCTURE
Filed Aug. 24, 1936  9 Sheets-Sheet 5
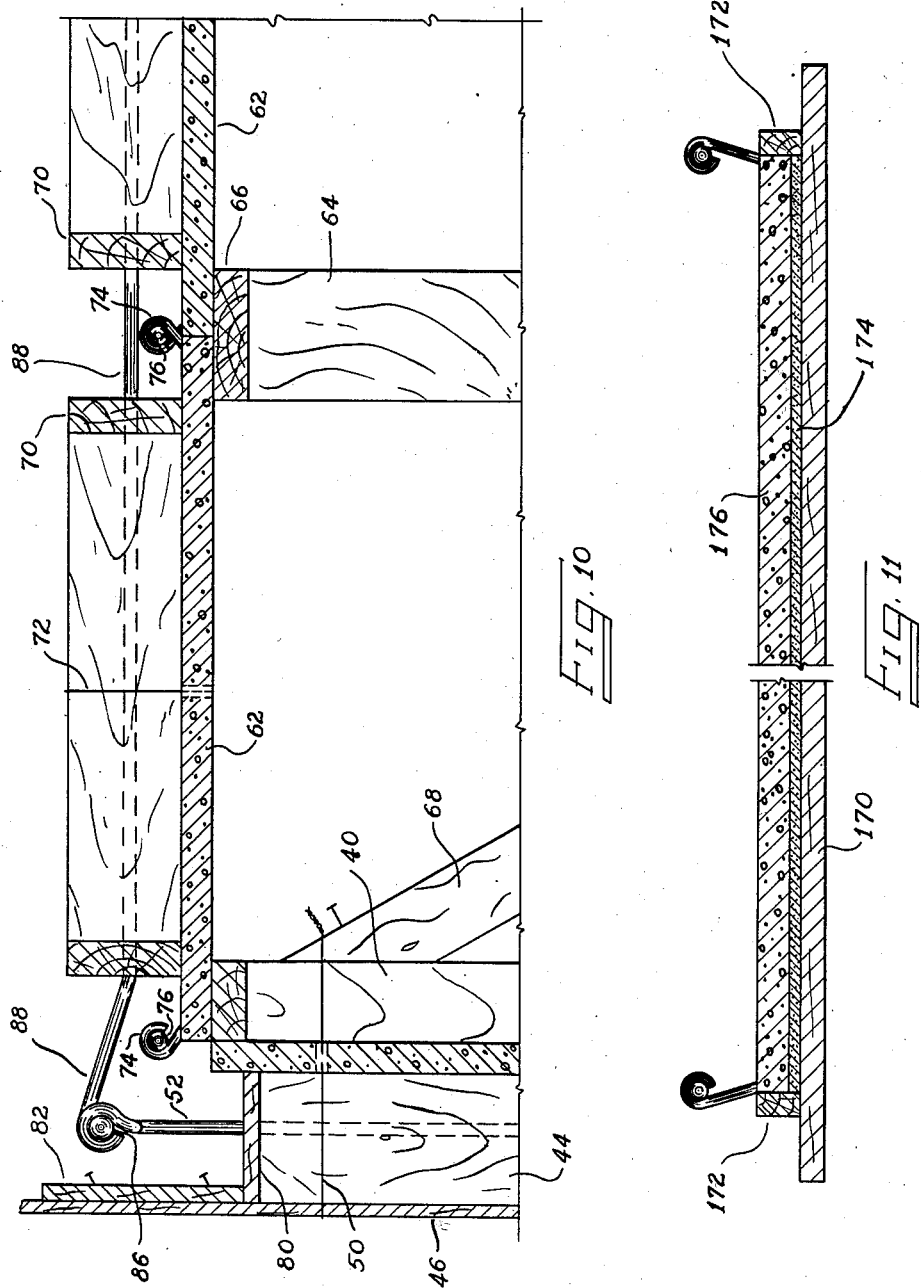
INVENTOR.
Ralph C. Vokes
BY Parker & Burton
ATTORNEYS

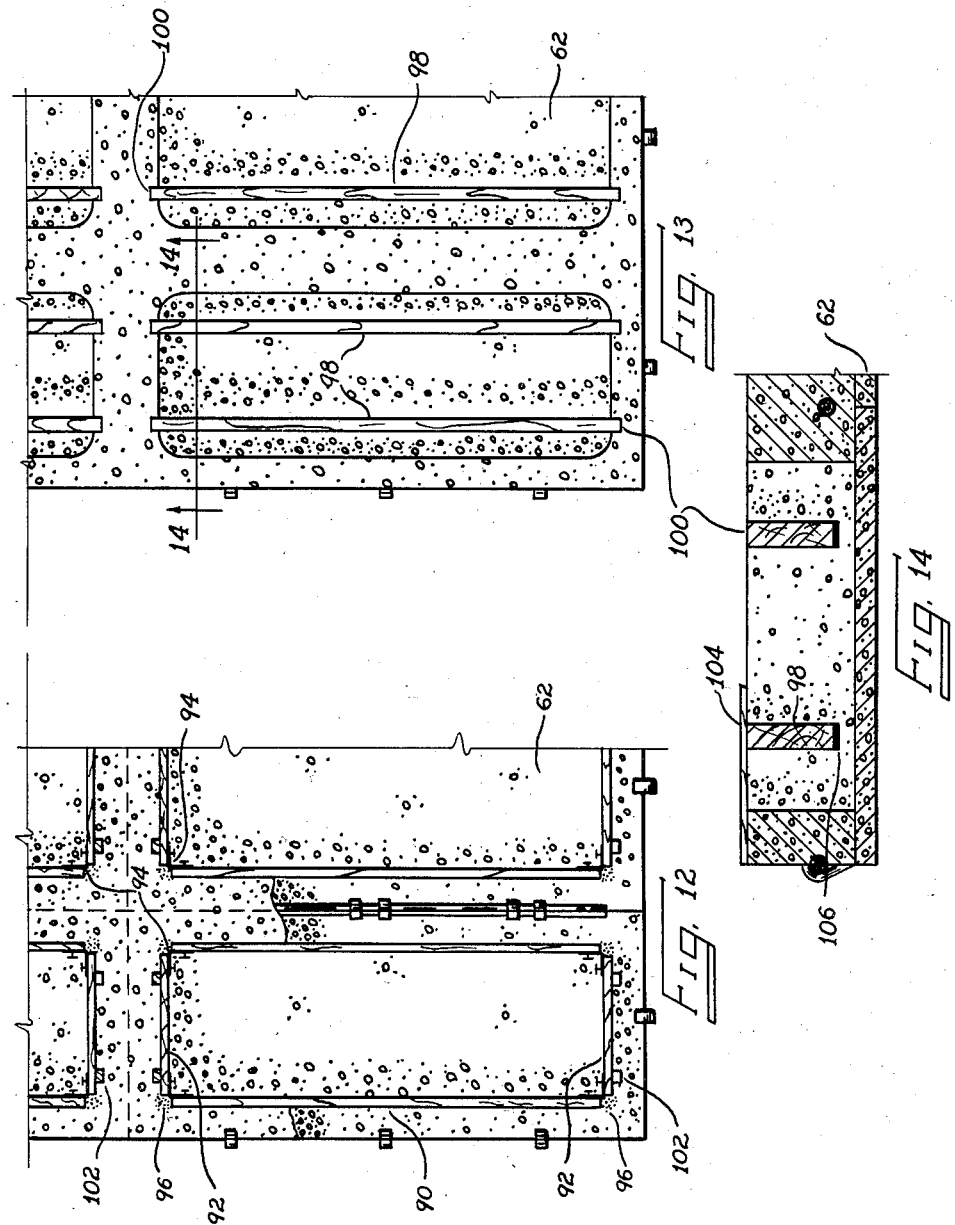

April 18, 1939.   R. C. VOKES   2,154,590
BUILDING STRUCTURE
Filed Aug. 24, 1936   9 Sheets-Sheet 7
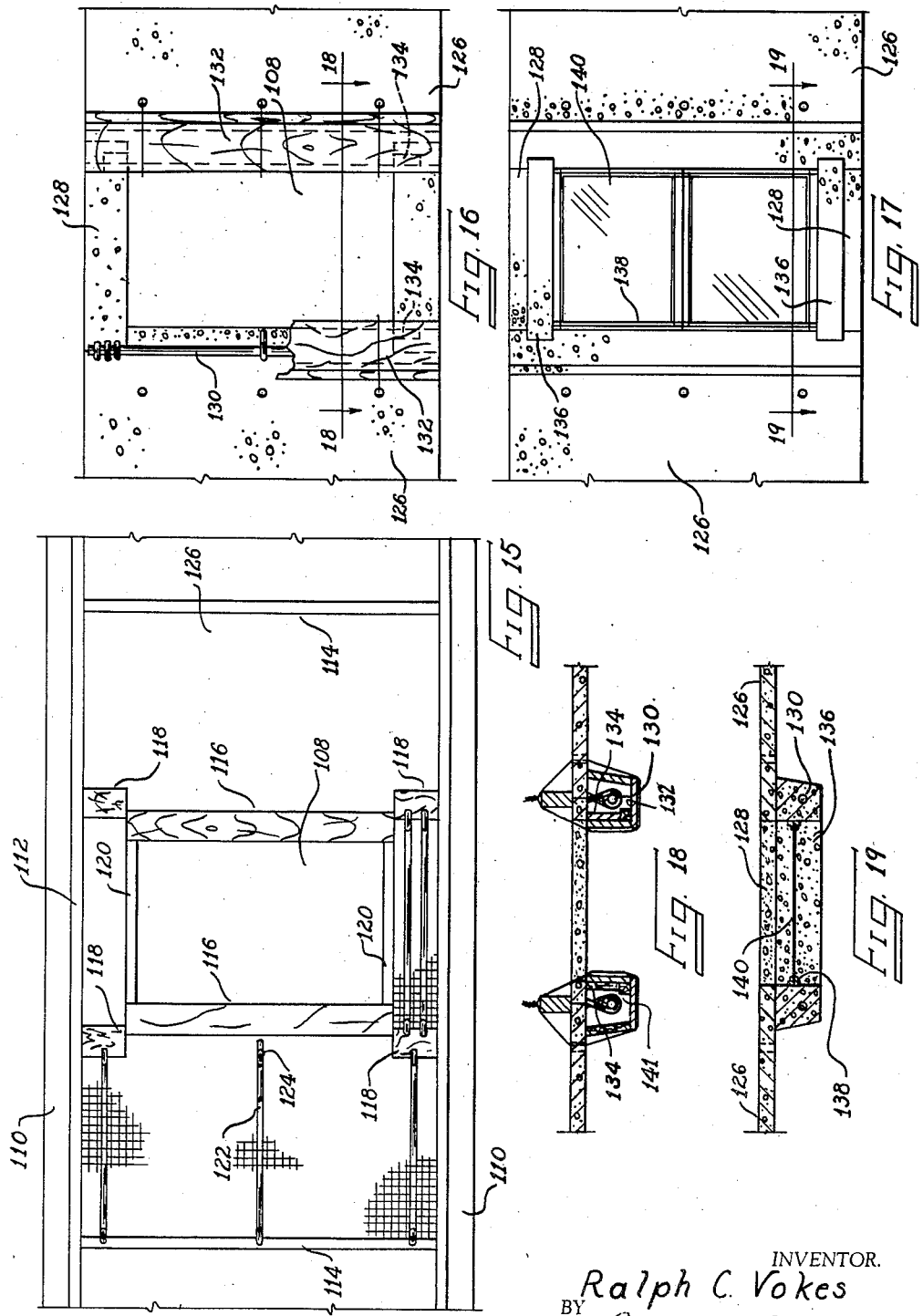
INVENTOR.
Ralph C. Vokes
BY Parker & Burton.
ATTORNEYS April 18, 1939.  R. C. VOKES  2,154,590
BUILDING STRUCTURE
Filed Aug. 24, 1936    9 Sheets-Sheet 8
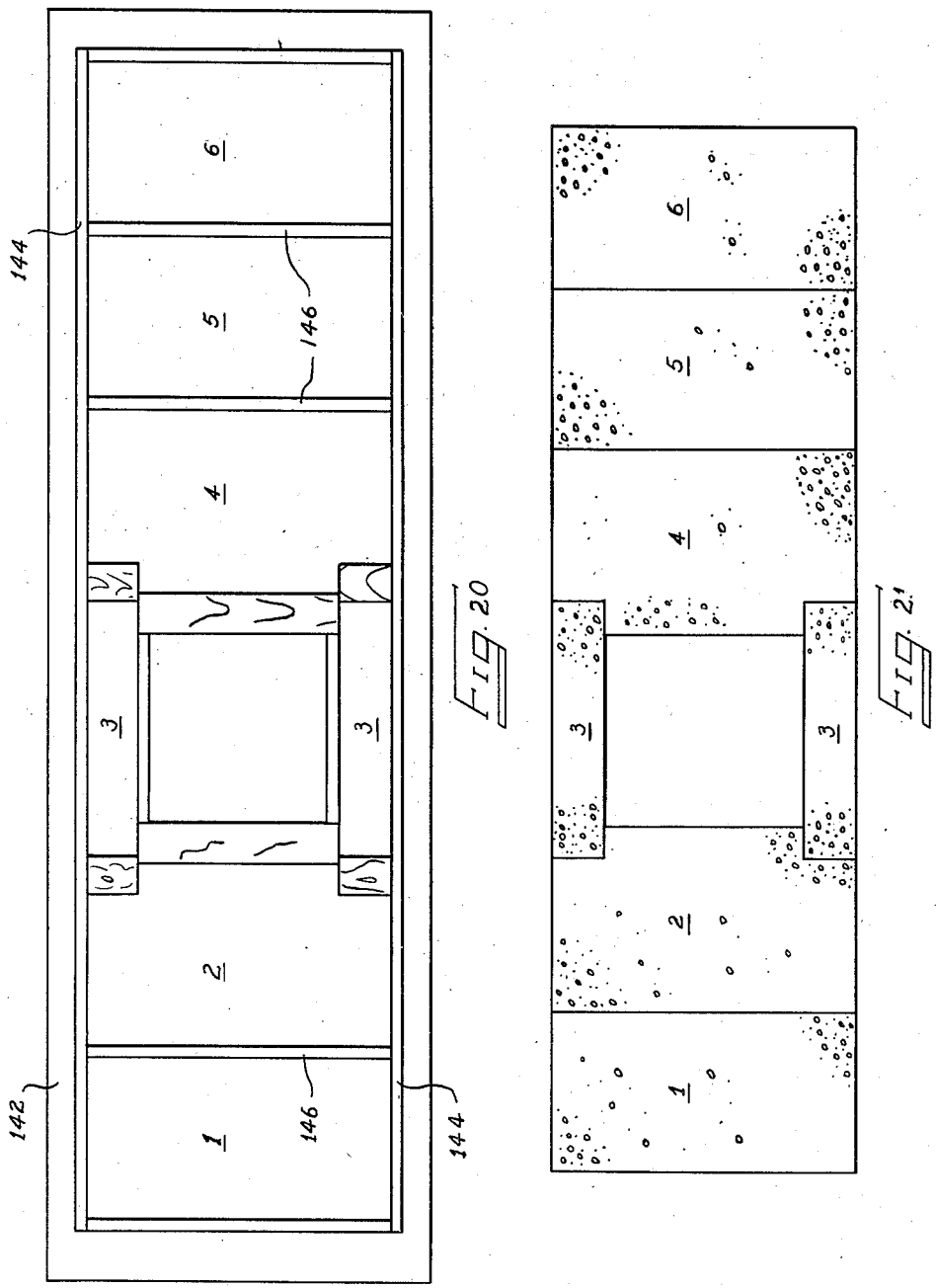
INVENTOR.
Ralph C. Vokes
BY  Parker & Burton
ATTORNEYS April 18, 1939.  R. C. VOKES  2,154,590
BUILDING STRUCTURE
Filed Aug. 24, 1936   9 Sheets-Sheet 9
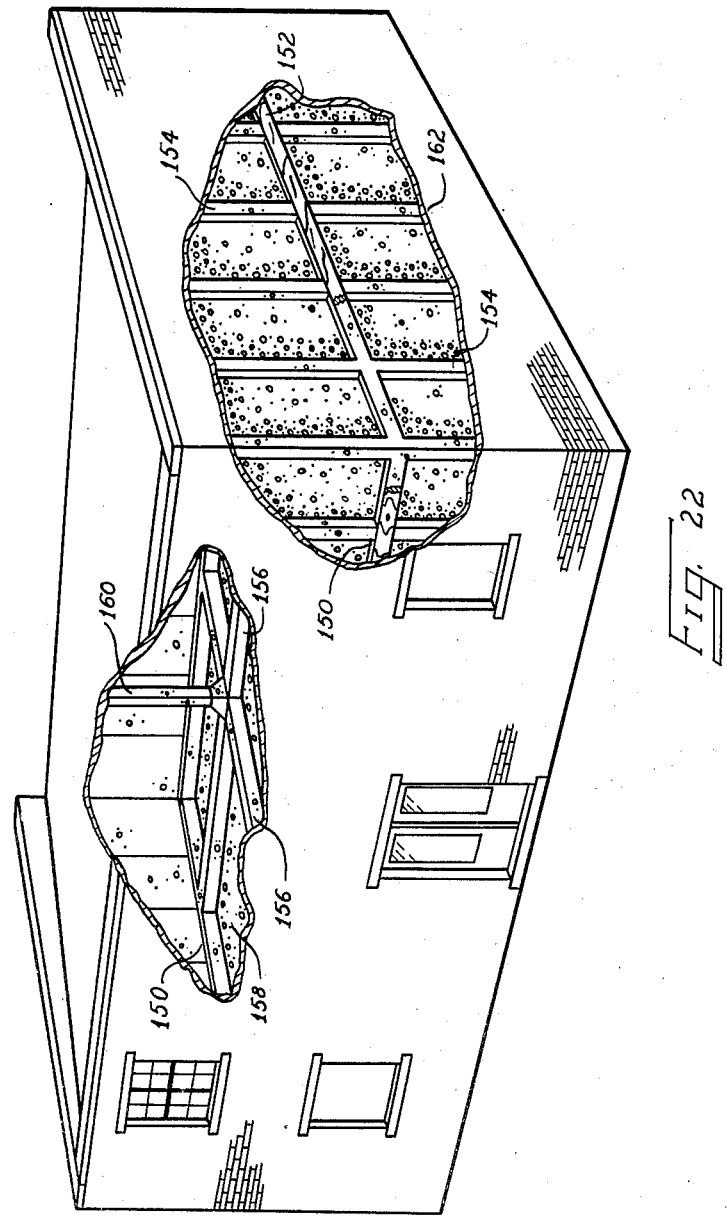
INVENTOR.
Ralph C. Vokes
BY Parker & Burton.
ATTORNEYS Patented Apr. 18, 1939

2,154,590

UNITED STATES PATENT OFFICE 2,154,590

BUILDING STRUCTURE

Ralph C. Vokes, Detroit, Mich.

Application August 24, 1936, Serial No. 97,521

18 Claims. (Cl. 72—1)

This invention relates to building structures and more particularly to a novel method of and means for constructing buildings.

Hithertofore, plastic material, such as cement, has been used in building construction but to a limited extent only because of the comparatively high cost of constructing buildings of this material. An important factor in the cost of constructing buildings of this type was the large outlay both in money and material that had to be made to provide suitable molds for casting the plastic material in proper formations. These molds were usually made of wooden members or boards, and they were employed in such a way that it was necessary to provide practically a new set of wooden casting implements for each building construction. This was particularly true of buildings composed to a large degree of plastic material, such as where the plastic material constituted the principal part of the framework, floors and walls of the building. The lumber employed in the casting operations was usually so broken up that it had to be thrown away after it served its purpose, and this practice, requiring a new set of lumber for each construction, increased the cost of such buildings to the extent that it was cheaper to construct buildings of the same design out of other materials. In addition, the methods pursued in casting the plastic elements of the building and associating the same together made it necessary to handle the plastic material a great amount which also raised the cost of construction.

An important object of this invention is to provide improvements in the use of plastic material, such as concrete, for constructing buildings. These improvements materially reduce the cost of constructing buildings of plastic materials. As a result buildings constructed for the most part of plastic material can now be economically constructed and compare favorably in cost with buildings of the same design but constructed of other materials. One meritorious feature of the invention is the ability to use the lumber employed in the casting operations over and over again in successive building operations, thus saving in the amount of lumber for this purpose. Furthermore, as the lumber becomes damaged after a number of casting operations it ultimately finds its way into various structural parts of the buildings so that practically no lumber is wasted.

Another important object of the invention is to provide a novel method of constructing buildings of plastic material which requires only a minimum of labor yet is rapid and easy to perform. As a result of this method, buildings of any shape or size can be constructed of plastic material, and my invention is particularly adapted to buildings wherein the framework, walls and floors are principally formed of plastic material. These various features of my invention, although adapted for buildings in which the main supporting structure is composed almost entirely of hardened plastic material, are readily incorporated in other buildings where plastic material is used to a lesser degree.

More particularly, an important object of this invention is to provide a novel method of molding or casting units of plastic material which are adapted to form when assembled together the principal structure of the walls and floors of the building. These units are cast in the form of panels or slabs and strengthened by the provision of reinforcing elements therein. A meritorious feature of the construction of each panel is the manner of allowing the reinforcements to protrude adjacent the edges of the panels but in such a way as not to interfere with bringing the panels into edgewise abutting engagement. By such a provision, panels of this type can be assembled side by side to form either the floor or the walls of the building.

An important and novel procedure in the process of making and assembling these panels is to form or cast these panels in a group side by side on a common supporting surface. The panels are separated from one another by temporary molding members which shape the adjacent edges of the panels to exactly the same configuration, such as making them parallel to one another. When the panels have hardened, they are assembled on the building in exactly the same position they assumed relative to one another during the casting operation except, with the temporary form members removed, the adjacent edges of the panels are brought into abutting engagement. The procedure of shaping the adjacent edges of the panels exactly alike during the casting operation and assembling them in edgewise abutting relationship on the building in the same order they assumed during the casting operation enables these panels to be fitted tightly together to form the wall and floor sections. The speed at which these panels can be assembled in this manner is greatly increased because they fit together without difficulty and no consideration need be taken of the possibility of cracks appearing in the walls or floors.

Another important feature of the invention is the manner of permanently supporting the panels in horizontal and vertical positions by means of hardened reinforced plastic elements. The wall panels and floor panels are first temporarily supported in positions in the building. They are permanently secured in this position by a novel framework of plastic elements formed or cast generally along the edges of the panels so that the protruding parts of the reinforcements employed in the panels are embedded in the framework.

This framework when completed comprises vertical columns or studs of plastic material, horizontal beams or joists of plastic material, and encircling monolithic bands or cordon units of plastic material extending around the building. The cordon units unite the horizontal and vertical structural members on each floor level into a composite whole. These units form, when hardened, the foundations for the floors thereabove. This supporting structure is poured by a novel floor-by-floor process which integrally joins all the elements of the frame into an interrelated, mutually supporting framework. Reinforcing elements, such as rods and dowel pins, are distributed in the framework as it is poured and form connecting elements between floors and the walls of the building.

Another object of the invention is to provide an improved nailless form for casting plastic material which preserves the lumber employed and enables it to be used over and over again both in the same and succeeding building constructions. The form comprises an assemblage of wooden boards held together in box-like condition by flexible strands or wires. These box-forms or molds are constructed along abutting edges of cast panels of plastic material, and the encircling wires are arranged to pass through the panels and to be tightened on the opposite side of the panels. Special holes are preformed in the panels for this purpose. The assembly also includes temporary members positioned against the abutting edges of the panels on the sides of the panels opposite each of the box-forms, and the ends of the wires are connected together along these members and tightened therearound. In addition to providing a nailless, easily dismantable mold for plastic material, the box-form also assists in supporting the panels of plastic material in position until the plastic material in the form has hardened.

Various other objects, advantages and meritorius features will become more apparent from the following specification, appended claims, and accompanying drawings wherein:

Fig. 1 illustrates the method and apparatus employed in casting the panel units for the walls and floors of the building, Fig. 2 is a cross-sectional view through one of the casting forms showing the positions assumed by the reinforcing elements prior to the casting operation, Fig. 3 is a view similar to Fig. 2 showing a modified type of reinforcement for the panel units, Fig. 4 is a plan view of the completed panel unit illustrating the respective positions of the exposed parts of the reinforcing elements, fastening holes and nailing element, Fig. 5 is a side view of the panel in Fig. 4, Fig. 6 is an end view of the panel in Fig. 4, Fig. 7 is a plan view adjacent a corner of a building showing the method of assembling the wall panel units and the forms for casting the studs, Fig. 8 is a horizontal cross-sectional view along line 8—8 in Fig. 7, illustrating the steps undertaken in assembling and supporting the wall panel units of the building, Fig. 9 is a horizontal cross-sectional view through a corner of a building above a floor level thereof illustrating the manner of assembling the floor panel units and casting the joistings and bridgings therefore, and partially broken away to show the manner of temporary supporting the floor elements, Fig. 10 is an enlarged cross-sectional view along line 10—10 of Fig. 9, Fig. 11 is a cross-sectional view of a modified form of wall or floor panel construction, Fig. 12 is a top view of a section of floor illustrating an early step in the method of constructing a modified floor structure, Fig. 13 is a top view of the floor section in Fig. 12 illustrating a later step in method of constructing the modified floor structure, Fig. 14 is a cross-sectional view along line 14—14 of Fig. 13, Figs. 15, 16 and 17 are views showing the method of casting the window sections of the building and the way they are assembled together on the building, Fig. 18 is a cross-sectional view along line 18—18 of Fig. 16, Fig. 19 is a cross-sectional view along line 19—19 of Fig. 17, Figs. 20 and 21 are schematic views illustrating the manner in which either the wall or floor panel are cast and then assembled together on a building, Fig. 22 is a view of a building partially broken away to illustrate the cordon unit encircling the building and the manner in which the studs and joists are integrally joined therewith.

In constructing a building according to the principles of this invention, the wall and floor panels of plastic material are preferably formed on the building site. Several of these may be cast at a time and upon hardening are assembled upon the buildings in the places intended for them. The method of casting these individual units is more particularly shown in Fig. 1.

A large wooden form or palette 10 is laid in horizontal position. This palette is divided into a plurality of rectangular areas by temporary members or forms 12 and 14 which may be composed of wood as shown. The particular rectangular forms on the palette 10 are shown in various stages of casting the panel units. The rectangular form at the left is empty. The one in the middle has the reinforcement in place and is ready for the pouring operation. In the rectangular form at the right, the plastic material, such as cement, has been poured and completely fills the form except for a corner where the material is broken away to show the interior construction.

The reinforcements for the panels or slabs of plastic material comprise a net or web 16 of metal wire, preferably poultry wire netting. This metallic web is supported in substantially the central plane of the rectangular form by transverse elements or metal rods 18. These rods are longer than the widths of the forms and rest at their extremities upon the transverse casting members 14. Each rod has a depressed center portion which lies below the top level of the casting forms when the rod is placed thereon as shown in Fig. 2. Each rod is interwoven through the wire netting 16 and in this manner carries the netting in spaced relationship above the top surface of the palette. A plurality of these reinforcing rods are interwoven in the metal web and stretched across each rectangular form. The outer extremities of the rods are preferably bent or curled inwardly as shown at 20. As will be more fully explained hereinafter the curled sections of the rods are disposed in substantial alignment and are adapted to support a rod extending therethrough. To retain the rods in fixed position it is desirable to provide a hole adjacent to the curled ends of each rod through which a nail 22 may be driven into the wooden transverse forms as shown in Figs. 1 and 2. This acts to hold the rods in upright position and retain the transverse casting members from spreading when the plastic material is poured therein.

In Fig. 3 there is shown a modified form of rod reinforcement. Instead of providing a rod structure which extends from one transverse form member to the other, two short rods 24 can be arranged in overlapping relationship to accomplish this result. One end of each of these rods is curled at 26 as in the previously described reinforcing rod. The other end 28 of each rod is bent opposite to the curled end and is adapted to rest on the top surface of the palette as shown in Fig. 3. The ends 28 are preferably pointed so that very little of the rod shows through the surface of the panel when the latter is cast. The middle or intermediate section of each rod is adapted to extend on a level about half-way between the palette and the top of the casting forms. As in the earlier described modification, the rods may be interwoven with the metallic web and nails may join the rods the casting members as shown.

Plastic material 30, which may be cement or any other suitable material, is poured into the rectangular forms until the level of the material reaches the top of the forms. This material completely covers the metallic web and the depressed portions of the rods leaving only the curled ends of the rods exposed along the edges of the material. In order to form holes in the plastic material when it hardens, spikes or bolts 32 are lightly driven into the palette before the plastic material is poured. The heads of these bolts extend above the top of the forms. After the plastic material is poured and hardened the heads of the bolts are grasped and removed from the slab. To assist in easy removal, the shanks of the bolts should be greased with a suitable substance such as soap. The holes formed in the panels after the removal of the bolts are shown at 34. It is preferred that a series of these be placed near each side edge of the panel.

After the plastic material is poured and while it is still plastic, handfuls or gobs of nailing cement 36 are forced into the material and allowed to harden therein with the rest of the slab. A suitable nailing cement is one part sawdust and one part cement. Gobs of this material in the slab furnish means for securing objects to the walls or floors of the building.

A complete hardened panel unit 38 is shown in Figs. 4, 5 and 6. The one shown here is preferably used for the walls of the buildings. For floor panel units it is desirable to have a curled rod section protruding from each end of the panel as well as along both sides. Attention is directed to the fact that the curled extremities of the rods do not extend from the sides of the panel but through the top surface adjacent the sides. As will become more apparent hereinafter, this construction enables the panel units to be brought into edgewise abutting relationship without interference from the exposed parts of the reinforcements. The curled extremities of the reinforcements, however, overhang the side edges of the panel units and when the panels are assembled side by side the curled extremities of the reinforcements extend in substantial alignment above the division between adjacent panel units.

In Figs. 7 and 8, I have shown how the slabs or panels 38 of plastic material are assembled together to form a wall of the building. The panels are brought into edgewise abutment and supported in that position by any suitable temporary means. The panels are so assembled that the curled extremities of the reinforcing rods are placed on the exterior side of the wall. The adjacent edges of the panels are boxed about in the following manner in order to form a mold for casting vertical studs of plastic material. Along each abutting edge of the panels and on the room side of the panels a relatively thick wooden member or brace 40 is positioned. In this position it overlaps onto the margins of the adjacent panels. For the corner, a square shaped brace 42 may be provided. On the exterior side of the panels along their abutting edges a box construction is formed of several pieces of lumber held together by wires stretched therearound. Each box form is preferably constructed of three boards, the two side pieces 44 and the outer end piece 46. For the corner four pieces may be used as shown. Before assembling these members together, a wooden strip 48 is lightly nailed to the inner side of the end member 42. The nails fastening the strip to the end member together should be driven only a short way into the strip in order to have the heads of the nails exposed for interlocking engagement with the plastic material which is to be poured into these forms.

The mold forming members 44 and 46 are retained in boxed formation by wires 50 which are passed around the members and through the holes 34 provided for this purpose in the panels. The ends of the wires are joined together about the brace members 40 and 42 and tightened by twisting the ends about each other. This draws the wooden form members tightly together and assists in temporarily supporting the panels in vertical position. Nails are not necessary for joining the box members together. This factor increases the life of the members and permits their use in subsequent building operations.

The curled over extremities of the reinforcing rods extend substantially in alignment with one another in the box forms. Vertical rods 52 are thrust through these curled ends and act to interlock the panels together. When plastic material is poured into the forms, the curled ends of the panel reinforcements and the rods 52 are deeply embedded in the material. After the plastic material thus poured has hardened, the wires 50 are removed and the wooden members 44 and 46 are stripped from the studdings. The strips 48 are deeply embedded in the cast studs and are permanently retained therein as wooden nailers to which parts of the building may be secured. The brace members 40 are also removed after the studs have hardened.

After the panels have been strengthened by studdings of plastic material, the interior and exterior surfaces of the wall can be decorated in any desirable way. For example, a brick veneer 54 can be laid along the outside of the building spaced from the panel units as shown at the right of Fig. 8. A material 56 of insulative qualities can be placed between the brick and the studdings as shown. The wooden nailer 48 can be used for securing this insulation in place. It is apparent that after the brick wall has been laid the greater portion of the wall contains air pockets between the panels 38 and the outer brick wall 54. This plus the insulation 56 insulates the interior of the building from the outside.

As explained previously, the floors of the building are likewise principally constructed of reinforced panels of plastic material. These panels are preformed on the premises of the building in exactly the same way as the wall panels previously described. The only difference may be the provision of reinforcing rods 18 or 24 at the ends of the panels as well as along the sides. The vertical wall panels are usually constructed of a length equal to about the distance from one floor level to another floor level. The horizontal floor panels can be constructed in various sizes and shapes depending on the sizes of the rooms and the outline of the building. Preferably the horizontal panels are supported on temporary shorings at about the top of the vertical wall panels. This is shown in Figs. 9 and 10.

Referring in more detail to Figs. 9 and 10 the vertical wall panels are shown at 38. Associated with these panels are molds, previously described in connection with Figs. 7 and 8, for forming studs of plastic material. The side casting members of these assemblies are indicated at 44, the end members at 46 and the inside brace members at 40. These members are drawn tightly against the surfaces of the panels by tensioning wires 50 are previously described. The brace members 40 are shorter in height than the panels and horizontal wooden beams 60 rest thereon and stretch from one brace to another. The top of these beams lie substantially flush with the top edge of the wall panel 38 and form a temporary support for one or more floor panels 62 of plastic material assembled side by side along the wall. The floor panels 62 are usually of insufficient size to stretch the length and width of the floor and a series of these panels are assembled edgewise to complete the floor. The abutting edges of these panels are temporarily shored by props 64 and horizontal beams 66. Inclined props 68 may be used wherever necessary to assist in supporting the vertical wall panels.

On the top of each floor panel there is carried a rectangular wooden framework 70 of less size than the panel. This is more clearly shown in Fig. 9. Each frame is preferably centered on its respective panel to provide a margin therearound. The rectangular wooden frame 70 may consist of a plurality of connected longitudinal and transverse members as shown. To secure the frames against movement on the panels the inner members may be secured to the floor panels by wire struts 72 turned through holes provided in the panel at the time it was cast. When a frame is properly mounted on each panel the entire floor is shaped with a plurality of interconnected channels following the abutting edges of the panels. When these channels are filled with plastic material and allowed to harden, as will be described more fully hereinafter, the joists and bridgings of the building will be formed. The rectangular frames 70 may be left permanently on the floor panels and form nailers for the floor of the room above. The area embraced by each frame is left empty, and when a finish flooring is placed over these frames and the joists of plastic material, the air spaces in the frames form a heat and sound insulation.

The curled extremities of the rod reinforcements in the floor panels are shown at 74. Reinforcing rods 76 extend through these curled formations on all sides of the frames. These extremities and the rods 76 are ultimately embedded in the hardened plastic material forming the joists and bridgings of the building.

In addition to forming the joists and bridgings of plastic material I provide a cordon or band of plastic material extending entirely around the building at each floor. This monolithic band of concrete or other hardened plastic substance is integrally joined with both the vertical studs and horizontal joist and binds these elements into a supporting framework of hardened plastic material. Vertical reinforcing elements in the studs and horizontal reinforcing elements in the joists extend into the cordon band or unit and interlock with one another and with reinforcements provided in the cordon unit to strengthen and unite the elements of the building.

The construction of the cordon band or unit of plastic material at one part of a building is shown in Figs. 9 and 10. This is typical of the cordon unit construction at all places in the building. To cast the cordon unit, a mold is formed of wooden members which extends entirely around in the building as each floor is constructed. The mold is formed before either the vertical studs for the wall below the cordon unit or the joists and bridgings of the floor on the level with the cordon unit are filled with plastic material. This enables the studs and joists associated with each cordon unit to be filled with plastic material at the same time the cordon unit is cast. This integrally joins the supporting elements of the building into a strong framework, and the provision of interlocking reinforcements both in these elements and the panels insures that the entire building is locked together sharing the stresses and loads imposed thereon.

The form for each cordon unit is supported upon the top edges of the wall panels and the wooden box molds for the studs. As shown in Figures 9 and 10 a horizontal plank 80 is stretched from the top of one box mold to the top of another. The ends of these planks are shaped to rest upon the upper edges of the side members 44 but do not extend over the top openings of the box molds so that plastic material can be poured thereinto. These planks will form the bottom faces of the cordon unit between studs. As shown in Figures 7 and 10 the end members 46 of the box molds protrude to a height above the floor panels 62 and the frames 70. To the inner side of these members a long horizontal plank 82, extending in a vertical plane, is lightly nailed. A series of these planks are nailed entirely around the building in this manner and form in conjunction with the planks 80 a form for casting a cordon unit of plastic material. The planks 82 are intended to form a permanent part of the building, and the heads of the nails securing them to the form members 46 are purposely left exposed for interlocking engagement with the plastic material of the cordon unit when the latter hardens.

When plastic material is poured into the channels for the joists and bridgings, it spreads through the connected channels onto the form for the cordon unit and thus down into the box molds for the studs. The pouring operation is continued until the forms for the studs, joists and cordon units are completely filled with plastic material. In Fig. 9, this plastic material is represented at 84. As each story of the building is constructed it is preferred that the studs, joists and cordon unit for each story be cast in this manner. After this material hardens, the wooden form members are stripped away except the framework 70, nailers 48 and the planks 82. The hardened plastic cordon units form a foundation upon which the wall panels for the next succeeding story can be supported and the cycle of operations is repeated.

As shown in Fig. 10, the reinforcing rods 52 to which the reinforcements in the wall panels 38 are connected extend through the top of the stud forms and hook-over or interlock with reinforcing rods 86 running lengthwise through the cordon unit. Likewise certain of the reinforcing rods in the bridgings and joistings may be connected to rod 86. This is likewise shown in Fig. 10 where rod 88 is representative of this construction. In Fig. 9 one such rod 86 for the cordon unit is shown at the left of the figure. This rod or a series of rods connected end to end encircle the building through the cordon unit. The section of rod 86 in the lower parts of Fig. 9, however, has been purposely left out in order to more clearly show the structure therebeneath.

Certain of the panel rods 76 closely parallel the cordon rod 86 and form an additional reinforcing member for the cordon unit. Additional reinforcing elements can be provided if desired. Various alterations in the connections of the rods one to another can be made as circumstances arise in the construction of buildings. An important feature of this construction is the fact that before the plastic material for the cordon unit and associated parts is poured, the interlocked and rigidifying character of all the reinforcing rods is sufficient to support the weight of the workingmen as they move about the building.

In Figs. 12, 13 and 14 I have shown a modified way of constructing the floors which saves in the use of the lumber employed for forming the floor joists. This modification enables rectangular casting frames similar to 70 to be used over and over again instead of being left in the plastic material as in the previous described modification. A rectangular frame similar in shape to the frames 70 is centered upon the top of each floor panel 62. This frame consists of two longitudinal members 90 and two transverse members 92 temporarily connected at each corner by angle irons 94. After the plastic material has been poured about these frames and hardened, each member of the frame is easily removed by first removing the angle irons. Before pouring the plastic material about these frames it is advisable to protect the angle irons and the ends of the members from interlocking with the plastic material by dropping clay or other suitable material around the corners as shown at 96.

To support a floor over the spaces above the floor panels 62 and between the joists, I show the provision of wooden timbers 98, preferably of 2 x 6 dimension, extending from one joist to another across the spaces above the floor panels. The ends of these timbers are supported in recesses 100 specially cast in the joists of plastic material. To form these recesses, blocks 102 of the same cross-sectional dimension as the timber 98 are fixed to the outside of the transverse form members 92 as shown in Fig. 12. These blocks are preferably not as deep as the plastic material of the joists so that a bond of plastic material extends between the bottom of the recesses and the top surface of the floor panels 62 as shown in Fig. 14. The timbers 98 are supported in these recesses spaced from the top of the panels 62. The top edges of the timbers 98 lie substantially flush with the top surfaces of the joistings and flooring 104 can be laid over these elements. The flooring can be yieldingly supported in a novel manner by the provision of resilient elements or rubber pads 106 in the bottoms of the recesses 100. When the floors are resiliently supported in this manner, the supporting timbers 98 should be raised above the joists so as to carry the entire load of the flooring 104.

The construction of the window openings may be a relatively expensive undertaking particularly since a large number of these are usually required in each building construction. This is especially true of apartment and office buildings. In Figs. 15 to 19 inclusive I have shown a method of constructing the window openings which is particularly adaptable to the type of building described herein. It is understood, however, that other kinds of window constructions are readily adaptable to this invention.

To provide a window opening 108 in the wall of the building the wall panels intended to surround the same are constructed in a novel way. Referring to Fig. 15, the wall units on either side of the intended window opening are cast on a palette 110 carrying longitudinal and transverse casting members 112 and 114 respectively. The edges of the wall panels bordering on the window openings are cast unevenly with the middle section of each border projecting toward the other. To form this construction, wider casting elements 116 and 118 are employed. As shown in Fig. 15, four elements 118 are disposed at the four corners of the window opening while two elements 116 are jogged inwardly towards one another. The wider character of these elements permits the formation of the jogs without allowing any of the plastic material to escape out of the wall panel forms. Obviously other kinds of casting implements can be used to accomplish this result. A pair of casting members 120 are arranged across the window opening at the ends of the elements 116 as shown. This completes the form for casting the window opening between wall panels.

Reinforcements of the kind illustrated in Figs. 1-3 may now be disposed in the forms. This is true of the small rectangular sections above and below the window openings 108. The middle reinforcing rods 122 may have their hooked over ends 124 bent further back than the other rods in order to position the hook in alignment with the others. Plastic material, such as cement, is poured into all the forms except the window opening 108 and allowed to harden into rigid self-supporting panel elements. These elements include the two wall units 126 on opposite sides of the window and smaller rectangular elements 128. After they have hardened, they are removed from the forms and assembled together in edgewise abutting relationship as shown in Fig. 16. The various elements surrounding the window opening fit together without difficulty and the exposed hook-shaped parts of the reinforcing rods are disposed in alignment.

As previously described, vertical reinforcing rods 130 are thrust through the curled extremities of the panel rods and box-forms 132 for the purpose of reinforcing the wall studs which are constructed around these reinforcing elements as shown in Fig. 16. The side of the studs adjacent the window opening are preferably cast perpendicular to the plane of the wall panels as shown in Figs. 18 and 19. Before the forms for the wall studs are assembled, several wooden blocks 134, shown in dotted lines in Fig. 16, are nailed to the inner side of the form member adjacent the window opening. These blocks are disposed opposite the wall elements 128 and form recesses in the wall studs when the latter are cast.

Oblong shaped blocks of plastic material 136 are cast in a separate operation and are fitted into the recesses in the studs in the manner shown in Fig. 17. The window opening is thus surrounded by monolithic structures of considerable thickness as shown in Fig. 19. A window frame 138 and a window pane 140 is shown assembled in the window opening.

An important object of this invention is to provide a novel method of assembling the wall and floor units which expedites the construction of the buildings and insures that no cracks or crevices appear between the assembled units. The method is particularly advantageous because it relieves the builders of the necessity of making careful calculations and exact operations. This method to be described accomplishes these results automatically.

Referring to Figs. 20 and 21, I show schematically the method I propose to follow in casting and assembling the panel units. The method is illustrated in connection with the construction of a wall but it will be appreciated that the method is equally applicable to floor constructions. In Fig. 20, the palette 142 carries a series of rectangular forms on which a number of wall panels are to be cast. The longitudinal casting members 144 shape the top and bottom edges of the wall panels. The short transverse casting members 146 shape the side edges of the wall panels. The longitudinal members 144 preferably extend parallel to one another and this is easily accomplished on the palette. The transverse members 146, however, may be placed on the palette in spaced relationship without any special concern about the distances separating the members or whether they extend perpendicular to the longitudinal form members 144. They may be quickly and easily assembled on the palette by eye judgment alone.

Reinforcements are now placed in the rectangular frames and plastic material poured thereinto until the reinforcements are submerged by the material in the manner shown in Figs. 1-3. After the material has taken a permanent set, the rigid panels formed in these frames are removed and assembled together to form a section of a building wall. This is shown schematically in Fig. 21. In order to carry out the method, the wall panels and associated elements are assembled together in the same relative positions they assumed when cast on the palette. The numbered designations 1, 2, 3, etc., appearing in Figs. 20 and 21 indicate this relationship. The only difference between the positions assumed by the panels on the palette and on the wall is that with the transverse members 146 removed the panels can be brought into edgewise abutting engagement as shown in Fig. 21.

Since the transverse casting members 146 and the casting elements employed around the window openings have parallel side edges, the panel elements cast on the palette assemble together with nicety when they abut one another in the same order they were cast. It will make no difference if the transverse members are spaced unevenly from one another or extend at various angles to one another. These irregularities are automatically compensated for by the step of assembling the panels in the same relative positions they assumed during the casting operation. Irregularities in width and shape of the panels will be easily covered by the wall studs which are later formed against the wall panels.

This method may also be used in casting and assembling floor panels. If desired, a larger palette can be used for receiving a second row of casting frames, and these two rows can be separated by a common longitudinal casting member 144. This last is particularly true when smaller sized panels are cast.

A building completed in accordance with this invention is shown in Fig. 22. The monolithic band or cordon unit which encircles the building on each floor level is shown at 150. As previously explained a board 152 may be fixed to the outside surface of the cordon unit and form a support to which parts of the wall structure can be attached. Integrally associated with the cordon unit are vertical wall studs 154 in which the reinforcements of the wall panels are embedded. The wall panels themselves occupy the spaces between the studs so that a complete wall of hardened plastic material is formed. Wooden nailers corresponding to those shown at 48 in Fig. 7 are intended to be fixed in the studs but they have been omitted from this figure in order to clearly show the other parts of the wall. Insulative material on the studs has likewise been omitted.

The interior view of the building shows the cordon unit 150 continuing around the building. The floor joists 156 integrally connect with the cordon unit on opposite sides of the building. Floor panels 158 are supported by the joists and form the ceiling for the rooms therebeneath. A flooring is placed over the joists but this is not shown. A vertical stud of plastic material in the interior of the building is shown at 160. The same principles used to cast the outside wall studs may be used to cast studs for the interior walls of the building. The whole building is sheathed with a brick veneer 162. Obviously any other outside finish may be employed if desired.

For certain of the rooms in the building such as the kitchen and bathroom, it is desirable to have a tile or marble finish which is both pleasing in appearance and impervious to water. In Fig. 11, I have illustrated a novel and economical method of making a panel adaptable for walls or floors and having a highly decorative water impervious coating which forms an integral part of the panel. A casting form similar to that provided in Fig. 1 is employed. It comprises of the base member or palette 170 and side casting members 172.

A laminated panel structure is cast by first pouring a layer of plastic material 174 which when it hardens forms a marble-like surface. Reinforcements 176 of the type shown in Fig. 1 are supported above the layer 174 but below the top level of the casting forms 172. It is desirable to wait for a few minutes while the layer 174 takes a slight set before filling the remainder of the form with plastic material. This last material 176 is preferably concrete or some similar substance. As in Fig. 1, it completely covers the reinforcements in the form leaving only the curled extremities for interlocking engagement with similar parts on other panels. Both layers of plastic material are allowed to harden together and in this manner the marble-like coating is integrally joined to the top layer 176. When both layers have hardened, the panel is removed from the form and assembled on the building. The marbleized finish on a series of such panels forms a very satisfactory wall or floor for certain of the rooms in a building. In addition a laminated panel of this kind can be used for making steps in a stairway. In this case, the marbleized finish would be exposed for treading. This method compares very favorably in cost with wall and floor constructions lined with separate marble or marble-like finishes.

What I claim:

1. In a building structure, a pair of panels of hardened plastic material assembled in edgewise abutting relationship, reinforcing elements embedded in both of said panels having parts thereof protruding through the faces of said panels adjacent the abutting edges thereof, said exposed parts of said reinforcing elements overlying the abutting edges of said panel and bent each upon itself to form a hook-shaped formation, and a rod extending through said hook-shaped formations in spaced relation to the abutting edges of said panels.

2. In a building structure, a pair of panels of hardened plastic material assembled in edgewise abutting relationship, a plurality of reinforcing elements embedded in both of said panels having parts thereof protruding through the faces of said panels adjacent the abutting edges thereof, said protruding parts of said elements overlying the abutting edges of said panel and being bent each upon itself to form a series of hook-shaped formations along the abutting edges of the panels, a rod extending through said hook-shaped formations and interlockingly securing said reinforcing elements together, and a band of hardened plastic material extending along the abutting edges of said panels embedding said rod and the protruding parts of said elements therewithin.

3. The method of constructing a section of a building which comprises preforming a plurality of panels of plastic material in a series of rectangular molding frames all mounted on a flat horizontal surface and divided from one another by molding frame members having parallel side edges, removing the panels of plastic material from their respective frames after they have hardened, and assembling said panels on the building in the same relative position they occupied during the preforming operation but with the edges of the panels brought into abutting relationship.

4. The method of constructing a wall of one story height for a building structure which comprises providing a form for plastic material consisting of a horizontal base element and a plurality of rectangular frames assembled on said element alongside of each other and occupying a substantial portion of the length and width of the wall to be formed, positioning reinforcing members in each of the spaces formed by said rectangular frames, filling the spaces formed by each of said rectangular frames with platsic material and embedding said reinforcing members therein, allowing said plastic material to harden and form reinforced rigid panels, removing said panels from their respective frames, and assembling said reinforced panels in vertical abutting relationship on the building structure in the same relative position that the panels occupied when cast on said base element.

5. The method of constructing a building which comprises supporting a plurality of panels of substantially one story in height in vertical edgewise abutting relationship to form a part of a wall for one story of the building, supporting a plurality of panels in horizontal edgewise abutting relationship to form a part of the floor of the next succeeding story of the building, providing temporary forms for receiving and retaining plastic material along the abutting edges of both the horizontal and vertical panels, providing a temporary form for receiving and retaining plastic material along the juncture of said horizontal and vertical panels which opens into the forms extending along the abutting edges of the horizontal and vertical panels providing reinforcing elements in the forms thus provided extending longitudinally therethrough in spaced relationship to the inner sides of the forms and the surfaces of said panels, and pouring plastic material into all the forms thus provided in one operation so that when the plastic material has hardened a rigid framework of plastic material having the reinforcing elements embedded therein is provided for supporting the panels.

6. The method of constructing a building which comprises supporting a plurality of panels of one story height in vertical edgewise abutting relationship to form the walls of one story of the building, supporting a plurality of panels in horizontal edgewise abutting relationship on a level with the floor above said vertical panels, providing temporary forms along the abutting edges of said vertical panels and said horizontal panels for receiving and retaining plastic material therein while the same hardens, providing a temporary form around the building at the place where the vertical and horizontal panels meet and which communicate with the forms provided along the edges of both the horizontal and vertical panels, and filling said forms with hardening plastic material in one operation so that the plastic material thus poured forms when hardened an interconnected supporting framework for the building.

7. A building frame composed of hardened plastic material comprising, in combination, a plurality of spaced vertical studs of hardened plastic material extending in the plane of the outer walls of the building from floor to floor, a cordon of hardened plastic material extending around the building at each floor level and integrally joined with said studs at their top and bottom portions, horizontal joists of hardened plastic material integrally joined to said cordons and extending inwardly and transversely across the building to form the floor supports thereof, and flat panels of reinforced hardened plastic material extending across the spaces between adjacent studs and adjacent joists and being of a size to overlap one side of the studs or the joists as the case may be and abut one another edge-to-edge, said panels each having reinforcing elements projecting from the marginal side portions thereof and embedded in the plastic material of the adjacent studs or joists as the case may be.

8. A building frame comprising, in combination, a plurality of upright members composed of hardened plastic material spaced apart from one another in the plane of the walls of the building and extending from one floor to another, a horizontal band of plastic material forming a cordon unit extending around the building on the level with each floor and integrally connected to each upright member, a plurality of horizontal joists of hardened plastic material extending transversely across the building from wall to wall on each floor level and integrally connected with said band of hardened plastic material extending around the building on each floor level, panels of hardened plastic material extending across the spaces between adjacent upright members and adjacent joists, said panels having metal rod reinforcements therein projecting through the side margins of the panels and embedded in the hardened plastic material of the adjacent member or joist as the case may be, and metal reinforcing rods extending longitudinally through the hardened plastic material of said upright members and said joists and projecting into the hardened plastic material of the cordon unit in overlapping relationship with similarly disposed reinforcing rods in the latter secured in the plastic material of said upright members and said joists.

9. In a building, a window construction comprising in combination, a pair of panels of hardened plastic material extending in the same plane and spaced from one another to provide the window opening, an element of hardened plastic material extending in the same plane as said panels and connected to the panels adjacent the top thereof, a second element of hardened plastic extending in the same plane as said panels and connected to the panels adjacent the bottom thereof, reinforcements in said panels and said elements having parts thereof protruding from the surfaces of said panels and said elements and interlocked with one another, studs of hardened plastic material extending along one side of said panels adjacent the margins thereof and embedding the exposed parts of said reinforcements therewithin, said studs having recesses formed opposite one another substantially on the level with said top and bottom elements, and blocks of hardened plastic material extending horizontally from one stud to the other and having the ends thereof supportingly received in said recesses.

10. In a building, a floor construction comprising, in combination, a plurality of panels of hardened plastic material assembled in a horizontal plane, joists of hardened plastic material extending along the edges of said panels, and provided with recesses therein on opposite sides of each panel, a wooden beam bridging the expanse of each panel and having its ends received within said recesses, a flooring supported upon said beams, and resilient means in said recesses yieldingly supporting said beams and the flooring carried thereby.

11. The method of constructing a building which comprises temporarily shoring a plurality of wall panels of substantially one story height in vertical sidewise relationship to form the walls around one story of the building, temporarily shoring a plurality of panels in horizontal sidewise relationship on a level with the top edge of said vertical wall panels and from the wall panels on one side of the building to those in the other side and thus form a part of the floor for the next succeeding story of the building, providing concrete casting forms on the outside faces of said wall panels along the side edges of each pair of adjacent wall panels and enclosing a side marginal portion of each wall panel therewithin so that a series of spaced vertical hollow forms are formed around the building walls, providing concrete casting forms on the top faces of said floor panels enclosing side and end marginal portions of each panel so that a series of interconnected channels are formed along the edges of the floor panels, providing concrete casting forms around the building on the level with the top edges of the wall panels forming a channel encircling the building but opening into the hollow interiors of said vertical columns forms of the wall panels and into the ends of the interconnected channel forms of the floor panels, filling said forms with plastic concrete material in one operation so that the concrete thus poured flows into all the forms in a plastic state and forms when hardened the studding, joists and an encircling band of concrete around the building which integrally connects the studding and joists together into a rigid frame work for the building, and removing the temporary supports for the vertical and horizontal panels after the plastic concrete material thus poured has hardened.

12. The method of constructing a building which comprises temporarily shoring panels of substantially one story height in vertical sidewise relationship to form the walls of one story of the building, temporarily shoring a plurality of panels in horizontal sidewise relationship on a level with the top edge of said vertical wall panels and extending the same across the building from the opposite side wall panels to form a part of the next story above, providing forms for receiving and retaining plastic material along the vertical edges of the wall panels and the side and end edges of the floor panels, providing a form around the building for receiving and retaining plastic material along the top of said wall panels opening into the ends of the vertical forms along the adjacent edges of each pair of wall panels and the ends of the horizontal forms along the edges of the floor panels and thus providing an interconnected series of forms along the edges of the wall and floor panels, supporting longitudinally extending metal reinforcing elements in the forms thus provided in spaced relationship to the inner sides of the forms and the surfaces of the panels, pouring hardening plastic material into all the forms thus provided in one operation so that the plastic material thus poured fills the forms embedding the reinforcing elements therewithin and provides when hardened a rigid integrally connected framework for one story of the building, and removing the temporary supports for the vertical wall panels and horizontal floor panels after the plastic material thus poured has hardened.

13. The method of constructing a building which comprises temporarily shoring a plurality of flat rectangularly shaped panels in edgewise relationship, disposing preformed rectangularly shaped forms of slightly less length and width than the panels against one side of each panel in such a way that a marginal portion of the latter is left around the outside of the form and thus providing with the cooperation of the marginal portions of the panels a series of interconnected channels extending along the side and end edges of the panels, positioning reinforcing rods in said channels in spaced relationship to the outer sides of said forms and the marginal portion of said panels, pouring hardening plastic material in said channels to substantially the top level thereof and embedding the reinforcing rods therewithin, allowing the plastic material to harden to form a series of integrally connected reinforced bands of hardened plastic material between the rectangular forms and along the edges of the panels, and removing the temporary supports for the panels after the plastic material thus poured has hardened.

14. In a building construction, a plurality of flat panels of rectangular formation assembled together in one plane, a plurality of rectangular wooden forms one for each panel and all disposed on the same side of the panels so that all the forms lie on one side of the plane of the assembled panels, said rectangular wooden forms being of slightly less length and width than the panel with which it is associated and disposed centrally against one side of the latter so that a plurality of interconnected channels are created between adjacent forms along the edges of the panels, reinforcing rods extending longitudinally through the channels thus created in spaced relationship to the surfaces of the panels and the inner sides of the channels, and bands of hardened plastic material filling the channels to substantially the top level thereof and embedding the reinforcing rods therewithin, said reinforced bands of hardened plastic material, said panels and said forms forming a permanent structural part of the building construction.

15. In a building construction, a plurality of flat panels of rectangular formation assembled together in a horizontal plane, a plurality of rectangular wooden forms one for each panel and all disposed on the top side of the panels so that all the forms lie on one side of the plane of the assembled panels, said rectangular wooden forms being of slightly less length and width than the panel with which it is associated and disposed centrally against one side of the latter so that a plurality of interconnected channels are created between adjacent forms along the edges of the panels, reinforcing rods extending longitudinally through the channels thus created in spaced relationship to the surfaces of the panels and the inner sides of the channels, bands of hardened plastic material filling the channels to substantially the top level thereof and embedding the reinforcing rods therewithin, and a flooring laid over said forms and said hardened plastic material and secured to the forms against removal, said reinforced bands of hardened plastic material, said panels, said forms and said flooring forming a permanent structural part of the building construction.

16. In a building structure, an open rectangular frame of nailable material surrounded by hardened plastic material, said frame including one or more transverse members extending across the opening in the frame and connecting opposite side members of the frame together, a rectangular panel of a slightly greater size than said frame secured to one side of the frame and projecting beyond at least three sides thereof, and means securing an intermediate part of said panel to one or more of the transverse connecting members of the frame.

17. In a building structure, an open rectangular frame of nailable material surrounded by hardened plastic material, said frame including one or more transverse members extending across the opening in the frame and connecting opposite side members of the frame together, and structural building elements of at least the width of said frame laid against one side of the frame, and means securing said elements to one or more of said transverse connecting members of the frame.

18. A building construction comprising, in combination, a plurality of members composed of hardened plastic material spaced apart from one another in the plane of the walls of the building and extending one story in height, a plurality of horizontal members of hardened plastic material extending in spaced apart relationship transversely across the building from one side to the other side in substantially the plane of the floor of the next upper story of the building, a horizontal band of hardened plastic material forming a cordon unit extending around the building in the plane of the outside walls and on substantially the plane of said floor, the hardened plastic material of said upright members, said horizontal members and said cordon unit being formed in one casting operation so that they are integrally united into a rigid supporting frame for the building, and wall surfacing material extending between said upright members closing the spaces therebetween and floor surfacing extending over said horizontal members closing the spaces therebetween.

RALPH C. VOKES.